United States Patent  (10) Patent No.: US 8,922,727 B2
Kizu et al.  (45) Date of Patent: Dec. 30, 2014

(54) LIQUID CRYSTAL LENS DEVICE AND IMAGE DISPLAY DEVICE

(71) Applicants: Yuko Kizu, Kanagawa-ken (JP); Ayako Takagi, Kanagawa-ken (JP); Shinichi Uehara, Tokyo (JP); Masako Kashiwagi, Kanagawa-ken (JP); Yoshiharu Momonoi, Kanagawa-ken (JP); Masahiro Baba, Kanagawa-ken (JP)

(72) Inventors: Yuko Kizu, Kanagawa-ken (JP); Ayako Takagi, Kanagawa-ken (JP); Shinichi Uehara, Tokyo (JP); Masako Kashiwagi, Kanagawa-ken (JP); Yoshiharu Momonoi, Kanagawa-ken (JP); Masahiro Baba, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 210 days.

(21) Appl. No.: 13/716,355

(22) Filed: Dec. 17, 2012

(65) Prior Publication Data

US 2013/0258214 A1 Oct. 3, 2013

(30) Foreign Application Priority Data

Mar. 28, 2012 (JP) ................. 2012-073792

(51) Int. Cl.
*G02F 1/1335* (2006.01)
*G02F 1/1343* (2006.01)
*G02F 1/29* (2006.01)
*G02B 27/26* (2006.01)

(52) U.S. Cl.
CPC .... *G02F 1/133526* (2013.01); *G02F 1/133528* (2013.01); *G02F 1/134309* (2013.01); *G02F 1/29* (2013.01); *G02B 27/26* (2013.01)
USPC ........................................... 349/15; 349/128

(58) Field of Classification Search
CPC ............ G02F 2001/133757; G02F 2001/1398; G02F 2001/134318; G02F 1/133784; G02F 1/133788; G02F 1/1396; G02F 1/133528; G02F 1/1337; G02F 1/133636; G02B 27/26; G02B 27/2214; G02B 27/225; G02B 5/3016
USPC ............ 349/129, 123, 128, 96, 126, 15, 179, 349/186, 5
See application file for complete search history.

(56) References Cited

U.S. PATENT DOCUMENTS 8,610,838 B2 * 12/2013 Kim et al. ................. 349/15
2006/0098296 A1 5/2006 Woodgate et al.
(Continued)

FOREIGN PATENT DOCUMENTS

JP 2010-211036 A 9/2010
JP 2010-224191 10/2010
(Continued)

OTHER PUBLICATIONS

Office Action issued Jun. 18, 2014 in Japanese Patent Application No. 2012-073792 (with English language translation).
Office Action issued Oct. 1, 2014 in Taiwanese Patent Application No. 102104574 (with English translation).

*Primary Examiner* — Thoi Duong
(74) *Attorney, Agent, or Firm* — Oblon, Spivak, McClelland, Maier & Neustadt, L.L.P.

(57) ABSTRACT

According to one embodiment, an image display device includes a liquid crystal lens device and an image display unit. The liquid crystal lens device includes a liquid crystal optical element unit. The liquid crystal optical element unit includes a first substrate unit, a second substrate unit and a liquid crystal layer. The liquid crystal layer is provided between the first and second substrate units. The liquid crystal layer has an alignment twisted by an angle not less than 5 degrees and not more than 45 degrees along a normal axis of a major surface of the first substrate unit. The image display unit includes a display unit. The second substrate unit is disposed between the first substrate unit and the display unit.

20 Claims, 4 Drawing Sheets

(56) References Cited

U.S. PATENT DOCUMENTS

2008/0266388 A1 10/2008 Woodgate et al.
2008/0284844 A1 11/2008 Woodgate et al.
2009/0122210 A1 5/2009 Im
2010/0182520 A1 7/2010 Yun et al.
2010/0238277 A1 9/2010 Takahashi et al.
2012/0038871 A1 2/2012 Inoue

FOREIGN PATENT DOCUMENTS

| JP | 2011-028286 A | 2/2011 |
| JP | 2012-037808 A | 2/2012 |
| TW | M395187 U1 | 12/2010 |
| TW | M398632 U1 | 2/2011 |
| TW | 201115221 A1 | 5/2011 |

* cited by examiner

LIQUID CRYSTAL LENS DEVICE AND IMAGE DISPLAY DEVICE

CROSS-REFERENCE TO RELATED APPLICATIONS

This application is based upon and claims the benefit of priority from the prior Japanese Patent Application No. 2012-073792, filed on Mar. 28, 2012; the entire contents of which are incorporated herein by reference.

FIELD

Embodiments described herein relate generally to a liquid crystal lens device and an image display device.

BACKGROUND

A liquid crystal optical element is known in which the distribution of the refractive index is changed according to the application of a voltage by utilizing the birefringence of liquid crystal molecules. There exists a stereoscopic image display device that combines an image display unit with such a liquid crystal optical element.

By changing the distribution of the refractive index of the liquid crystal optical element, the stereoscopic image display device switches between a state in which the image displayed on the image display unit is incident on the eyes of a human viewer as displayed on the image display unit and a state in which the image displayed on the image display unit is incident on the eyes of the human viewer as multiple parallax images. Thereby, a high definition two-dimensional pixel display operation and a three-dimensional image display operation are realized, where the three-dimensional image display operation includes stereoscopic viewing with the naked eyes due to the multiple parallax images. It is desirable to realize good optical characteristics of the liquid crystal optical element used in the stereoscopic image display device.

DETAILED DESCRIPTION

Figure 1A:
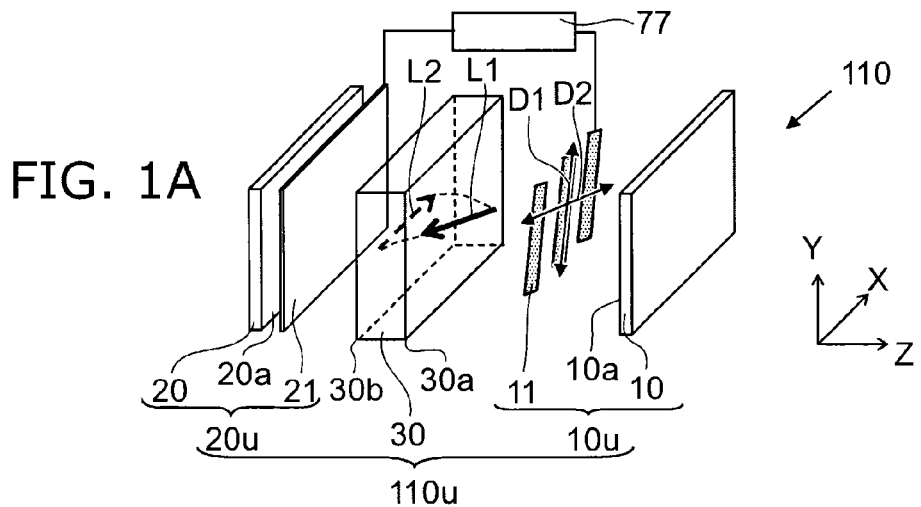
FIG. 1A to FIG. 1F are schematic views illustrating the configuration of a liquid crystal lens device according to a first embodiment.

According to one embodiment, an image display device includes a liquid crystal lens device and an image display unit. The liquid crystal lens device includes a liquid crystal optical element unit. The liquid crystal optical element unit includes a first substrate unit, a second substrate unit, and a liquid crystal layer. The first substrate unit includes a first substrate having a first major surface, and a plurality of first electrodes provided on the first major surface to extend along a first direction. The first electrodes are arranged in a direction non-parallel to the first direction. The second substrate unit includes a second substrate having a second major surface opposed to the first major surface, and a counter electrode provided on the second major surface. The liquid crystal layer is provided between the first substrate unit and the second substrate unit. The liquid crystal layer has a first alignment direction and a second alignment direction. The first alignment direction is a long-axis direction of liquid crystal molecules on the first substrate unit when projected onto the first major surface. The first alignment direction is orthogonal to the first direction. The second alignment direction is a long-axis direction of liquid crystal molecules on the second substrate unit when projected onto the first major surface. The liquid crystal layer has an alignment twisted between the first alignment direction and the second alignment direction by an angle not less than 5 degrees and not more than 45 degrees along a normal axis of the first major surface. The image display unit includes a display unit. The second substrate unit is disposed between the first substrate unit and the display unit. The display unit is configured to cause image light of polarized light having a polarizing axis parallel to the second alignment direction to be incident on the liquid crystal optical element unit.

According to one embodiment, an image display device includes a liquid crystal lens device and an image display unit. The liquid crystal lens device includes a liquid crystal optical element unit. The liquid crystal optical element unit includes a first substrate unit, a second substrate unit, and a liquid crystal layer. The first substrate unit includes a first substrate having a first major surface, and a plurality of first electrodes provided on the first major surface to extend along a first direction. The first electrodes are arranged in a direction non-parallel to the first direction. The second substrate unit includes a second substrate having a second major surface opposed to the first major surface, and a counter electrode provided on the second major surface. The liquid crystal layer is provided between the first substrate unit and the second substrate unit. The liquid crystal layer has a first alignment direction and a second alignment direction. The first alignment direction is a long-axis direction of liquid crystal molecules on the first substrate unit when projected onto the first major surface. An absolute value of an angle between the first alignment direction and a second direction is more than 0 degrees and not more than 5 degrees. The second direction is parallel to the first major surface and perpendicular to the first direction. The second alignment direction is a long-axis direction of liquid crystal molecules on the second substrate unit when projected onto the first major surface. The liquid crystal layer has an alignment twisted between the first alignment direction and the second alignment direction by an angle not less than 5 degrees and not more than 45 degrees along a normal axis of the first major surface. The image display unit includes a display unit. The second substrate unit is disposed between the first substrate unit and the display unit. The display unit is configured to cause image light of polarized light having a polarizing axis parallel to the second alignment direction to be incident on the liquid crystal optical element unit.

According to one embodiment, a liquid crystal lens device includes a liquid crystal optical element unit. The liquid crystal optical element unit includes a first substrate unit, a second substrate unit, and a liquid crystal layer. The first substrate unit includes a first substrate having a first major surface, and a plurality of first electrodes provided on the first major surface to extend along a first direction. The first electrodes are arranged in a direction non-parallel to the first direction. The second substrate unit includes a second substrate having a second major surface opposed to the first major surface, and a counter electrode provided on the second major surface. The liquid crystal layer is provided between the first substrate unit and the second substrate unit. A first alignment direction is orthogonal to the first direction. The first alignment direction is a long-axis direction of liquid crystal molecules on the first substrate unit when projected onto the first major surface. The liquid crystal layer has an alignment twisted by an angle not less than 5 degrees and not more than 45 degrees along a normal axis of the first major surface.

Embodiments will now be described with reference to the drawings.

The drawings are schematic or conceptual; and the relationships between the thicknesses and the widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing therein above are marked with like reference numerals, and a detailed description is omitted as appropriate.

First Embodiment

FIG. 1A to FIG. 1F are schematic views illustrating the configuration of a liquid crystal lens device according to a first embodiment.

FIG. 1A is a schematic perspective view illustrating the configuration of the liquid crystal lens device 110. FIG. 1B to FIG. 1F are schematic views illustrating the optical axis of the liquid crystal lens device 110. In FIG. 1A, the components are drawn as being separated from each other for easier viewing.

As illustrated in FIG. 1A, the liquid crystal lens device 110 according to the embodiment includes a liquid crystal optical element unit 110u.

The liquid crystal optical element unit 110u includes a first substrate unit 10u, a second substrate unit 20u, and a liquid crystal layer 30.

The first substrate unit 10u includes a first substrate 10 and multiple first electrodes 11. The first substrate 10 has a first major surface 10a.

The multiple first electrodes 11 are provided on the first major surface 10a. The first electrodes 11 extend along a first direction D1. The multiple first electrodes 11 are arranged in a direction non-parallel to the first direction D1.

A direction parallel to the first major surface 10a and perpendicular to the first direction D1 is taken as a second direction D2. For example, the multiple first electrodes 11 are arranged in the second direction D2.

The second substrate unit 20u includes a second substrate 20 and a counter electrode 21. The second substrate 20 has a second major surface 20a opposed to the first major surface 10a. The counter electrode 21 is provided on the second major surface 20a.

In the specification of the application, being "opposed" includes not only the state of directly facing each other but also the state of facing each other with another component inserted therebetween.

The liquid crystal layer 30 is provided between the first substrate unit 10u and the second substrate unit 20u. The liquid crystal layer 30 includes a first layer 30a that contacts the first substrate unit 10u, and a second layer 30b that contacts the second substrate unit 20u. The first layer 30a corresponds to the portion of the liquid crystal layer 30 at the interface between the first substrate unit 10u and the liquid crystal layer 30; and the second layer 30b corresponds to the portion of the liquid crystal layer 30 at the interface between the second substrate unit 20u and the liquid crystal layer 30. The long-axis direction of the liquid crystal molecules of the first layer 30a when projected onto the first major surface 10a is taken as a first alignment direction L1.

On the other hand, the long-axis direction of the liquid crystal molecules of the second layer 30b inside the liquid crystal layer 30 when projected onto the first major surface 10a is taken as a second alignment direction L2.

The first alignment direction L1 and the second alignment direction L2 each include information of the orientation (the orientation from the start point toward the end point) in addition to the information of the axis.

As illustrated in FIG. 1A, an axis perpendicular to the first major surface 10a is taken as a Z-axis direction. One axis perpendicular to the Z-axis direction is taken as an X-axis direction. A direction perpendicular to the Z-axis direction and the X-axis direction is taken as a Y-axis direction.

Figure 1B:
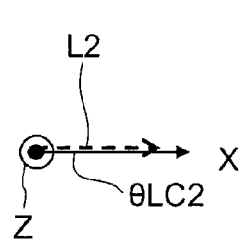

As illustrated in FIG. 1B, the direction from the start point toward the end point of the second alignment direction L2 is taken to be parallel to the X-axis direction. In other words, the angle (a second alignment angle $\theta LC2$ (degrees)) of the direction from the start point toward the end point of the second alignment direction L2 having the X-axis direction as the reference is 0 degrees.

Figure 1C:
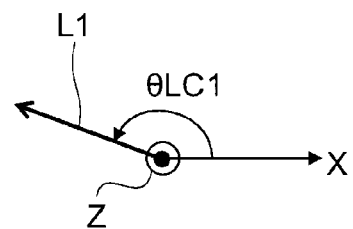

As illustrated in FIG. 1C, the angle of the direction from the start point toward the end point of the first alignment direction L1 having the X-axis direction as the reference is taken as a first alignment angle $\theta LC1$ (degrees). The first alignment angle $\theta LC1$ is the angle of the direction from the start point toward the end point of the first alignment direction L1 when the direction from the start point toward the end point of the second alignment direction L2 is the reference. The angles such as the first alignment angle $\theta LC1$, etc., are expressed as being not less than 0 degrees and not more than 180 degrees or being between −180 degrees and 0 degrees.

In the case where the first alignment angle $\theta LC1$ is 180 degrees, the first alignment direction L1 is antiparallel to the second alignment direction L2. In such a case, a homogeneous alignment is formed in the liquid crystal layer 30. On the other hand, in the case where the first alignment angle $\theta LC1$ is 0 degrees, the orientation of the first alignment direction L1 is the same as the orientation of the second alignment direction L2. In the case where there is a pretilt in the liquid crystal layer 30, a splay alignment (or a bend alignment) is formed. Or, a twist alignment having an angle of 180 degrees, etc., is formed.

In the embodiment, the first alignment direction L1 is set to be non-parallel to the second alignment direction L2. Accordingly, the first alignment direction L1 is neither 0 degrees nor 180 degrees. In the embodiment, the twist of the alignment of the liquid crystal layer 30 is set to be less than 90 degrees. Then, an alignment that is not a splay alignment (or a bend alignment) is formed. In such a case, the pretilt angle may be not less than 0 degrees.

Figure 1D:
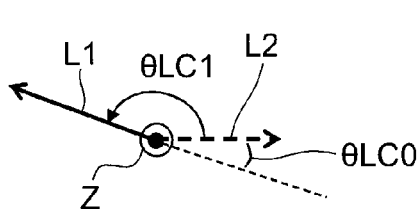

As illustrated in FIG. 1D, a twist angle $\theta LC0$ (degrees) of the liquid crystal that is determined by the first alignment direction L1 and the second alignment direction L2 is defined by a formula: $\theta LC0$ (degrees)$=180-\theta LC1$ (degrees).

In the embodiment as described below, the twist angle $\theta LC0$ is set to be not less than 5 degrees and not more than 45 degrees. The alignment of the liquid crystal of the liquid crystal layer 30 is twisted from the first alignment direction L1 toward the second alignment direction L2. In other words, the liquid crystal layer 30 has an alignment that is twisted by the twist angle θLC0 that is not less than 5 degrees and not more than 45 degrees.

In such a case, the angle (the first alignment angle θLC1) of the direction from the start point toward the end point of the first alignment direction L1 (the long-axis direction of the liquid crystal molecules of the first layer 30a when projected onto the first major surface 10a) is not less than 135 degrees and not more than 175 degrees when the direction from the start point toward the end point of the second alignment direction L2 (the long-axis direction of the liquid crystal molecules of the second layer 30b when projected onto the first major surface 10a) is the reference.

Figure 1E:
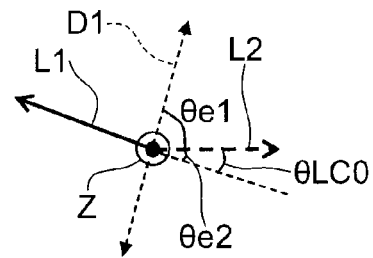

In the embodiment as illustrated in FIG. 1E, the first alignment direction L1 is set to be substantially orthogonal to the first direction D1. In other words, the first alignment direction L1 is substantially parallel to the second direction D2.

In the specification, considering manufacturing fluctuation, etc., the state of being orthogonal includes not only the case where the angle between axes is 90 degrees but also the state in which the angle is not less than 85 degrees and not more than 95 degrees. Similarly, in the specification, the state of being parallel includes not only the case where the angle between axes is 0 degrees but also the state in which the angle is not less than −5 degrees and not more than +5 degrees (the absolute value is not more than 5 degrees).

Figure 1F:
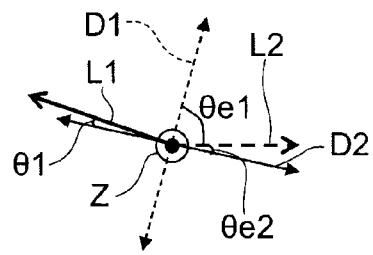

In other words, as illustrated in FIG. 1F, the absolute value of the angle between the first alignment direction L1 and the first direction D1 is not less than 85 degrees and not more than 95 degrees. The absolute value of the angle (a first angle θ1) between the first alignment direction L1 and the second direction D2 is not more than 5 degrees.

Thus, in the embodiment, the first alignment direction L1, which is the long-axis direction of the liquid crystal molecules on the first substrate unit 10u when projected onto the first major surface 10a, is orthogonal to the first direction D1 (the absolute value of the angle between the first alignment direction L1 and the first direction D1 is not less than 85 degrees and not more than 95 degrees). The liquid crystal layer 30 has an alignment twisted by an angle not less than 5 degrees and not more than 45 degrees along a normal axis (the Z axis) of the first major surface 10a. That is, the liquid crystal layer 30 has an alignment twisted by an angle not less than 5 degrees and not more than 45 degrees along an axis (the Z axis) perpendicular to the first major surface 10a.

On the other hand, as illustrated in FIG. 1E, the angle (an electrode orthogonal angle θe2 (degrees)) between the second direction D2 and the second alignment direction L2 is the same as the twist angle θLC0 (not less than 5 degrees and not more than 45 degrees). The angle (an electrode extension angle θe1 (degrees)) between the first direction D1 and the second alignment direction L2 is equivalent to 90 minus the twist angle θLC0 (degrees) and is not less than 45 degrees and not more than 85 degrees.

Figure 2:
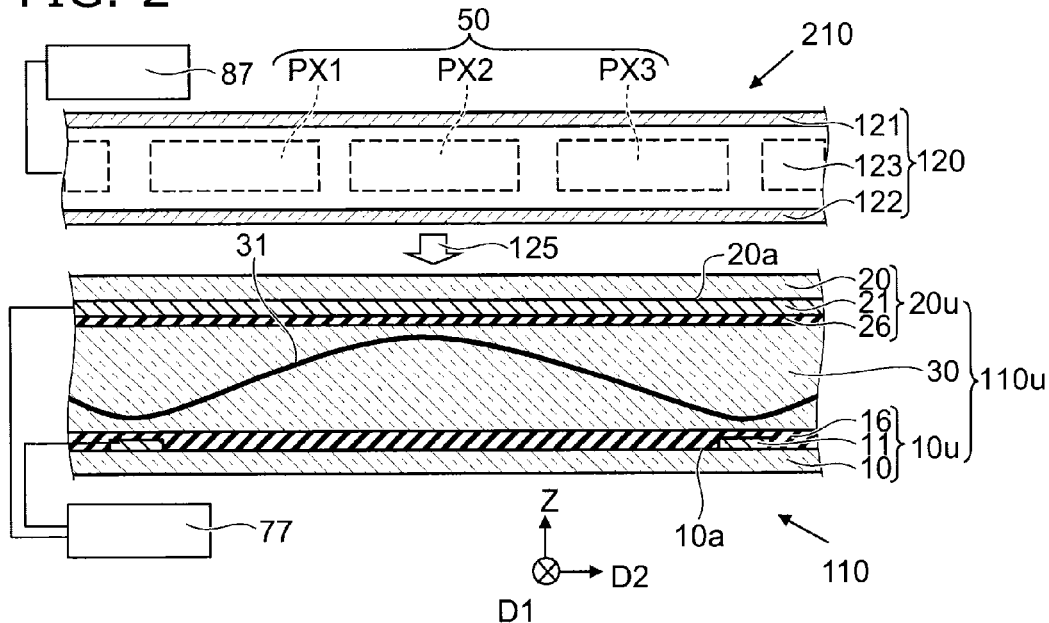
FIG. 2 is a schematic cross-sectional view illustrating the configuration of the liquid crystal lens device according to the first embodiment.

FIG. 2 is a schematic cross-sectional view illustrating the configuration of the liquid crystal lens device according to the first embodiment. FIG. 2 also illustrates one example of the state of use of the liquid crystal lens device 110 according to the embodiment. The liquid crystal lens device 110 may be used as an image display device 210 by combining with a display unit 120.

The image display device 210 includes the liquid crystal lens device 110 (the liquid crystal optical element unit 110u) and the display unit 120. The display unit 120 is stacked with the liquid crystal optical element unit 110u.

In the specification, "stacked" includes not only the state of being directly overlaid but also the state of being overlaid with another component inserted therebetween.

The second substrate unit 20u is disposed between the first substrate unit 10u and the display unit 120. The display unit 120 causes image light 125 which is polarized light to be incident on the liquid crystal optical element unit 110u.

The display unit 120 may include any display device. For example, a liquid crystal display device, an organic EL display device, a plasma display, etc., may be used as the display unit 120.

For example, in the case where the liquid crystal display device is used as the display unit 120, the display unit 120 includes a first polarizing layer 121, a second polarizing layer 122, and a display liquid crystal layer 123. The display liquid crystal layer 123 is provided between the first polarizing layer 121 and the second polarizing layer 122. The first polarizing layer 121 and the second polarizing layer 122 may include, for example, a polarizer, a polarizing film, a polarizing filter, etc. In this example, the display liquid crystal layer 123 is disposed between the first polarizing layer 121 and the liquid crystal optical element unit 110u; and the second polarizing layer 122 is disposed between the display liquid crystal layer 123 and the liquid crystal optical element unit 110u. The polarized light of the image light 125 emitted from the display unit 120 is formed by the second polarizing layer 122.

The image light 125 includes image information. The image display device 210 may further include a display control unit 87 that controls the display unit 120. The display unit 120 produces the image light 125 that is modulated based on a signal supplied from the display control unit 87 to the display unit 120. For example, the display unit 120 emits the image light 125 that includes multiple parallax images 50 (e.g., first to third parallax images PX1 to PX3, etc.).

In the liquid crystal optical element unit 110u, the alignment of the liquid crystal of the liquid crystal layer 30 is changed by applying a voltage between the counter electrode 21 and the first electrodes 11. Thereby, the effective refractive index of the liquid crystal layer 30 changes; and a refractive index distribution 31 is formed inside the liquid crystal layer 30. The refractive index is constant in the first direction D1 because the first electrodes 11 extend along the first direction D1. The refractive index changes along the second direction D2 in conjunction with the positions where the first electrodes 11 are provided. In other words, a lens having a lenticular configuration extending along the first direction D1 is formed.

Thus, for example, the liquid crystal optical element unit 110u functions as a liquid crystal GRIN lens (Gradient Index lens). The refractive index distribution 31 of the liquid crystal optical element unit 110u is changeable. For example, when the voltage is not applied between the counter electrode 21 and the first electrodes 11, the refractive index is substantially uniform in the D1-D2 plane. In this state, the optical path of the light that passes through the liquid crystal optical element unit 110u substantially does not change. When the voltage is applied between the counter electrode 21 and the first electrodes 11, the refractive index changes along the second direction D2. In this state, the optical path of the light that passes through the liquid crystal optical element unit 110u is modulated.

In the liquid crystal optical element unit 110u, the first substrate unit 10u may further include another electrode provided on the first major surface 10a. For example, the other electrode is provided between the first electrodes 11 and extends along the Y-axis direction. For example, the potential of the other electrode is set to be the same as the potential of the counter electrode 21. The positions of the first electrodes 11 correspond to the lens ends; and the position of the other electrode recited above corresponds to the position of the lens center.

As illustrated in FIGS. 1A and FIG. 2, the liquid crystal lens device 110 may further include a control unit 77. The control unit 77 is electrically connected to the first electrodes 11 and the counter electrode 21. The control unit 77 forms the refractive index distribution 31 in the liquid crystal layer 30 by controlling the potential of the first electrodes 11 and the potential of the counter electrode 21.

For example, the image display device 210 provides a two-dimensional image display in the operating state in which the liquid crystal optical element unit 110u substantially does not modulate the optical path. For example, the image display device 210 provides a three-dimensional image display in the operating state in which the liquid crystal optical element unit 110u modulates the optical path. During the three-dimensional image display, stereoscopic viewing is perceived by the naked eyes.

As illustrated in FIG. 2, the first substrate unit 10u may further include a first alignment film 16. The first alignment film 16 is provided on the first major surface 10a and on the first electrodes 11. The second substrate unit 20u may further include a second alignment film 26. The second alignment film 26 is provided on the counter electrode 21 (including being provided on the second major surface 20a). The initial alignment of the liquid crystal layer 30 is formed by performing prescribed processing of these alignment films.

For example, in the case where the liquid crystal alignment of the liquid crystal layer 30 is formed by rubbing, the first alignment direction L1 substantially matches the rubbing direction of the first substrate unit 10u. The second alignment direction L2 substantially matches the rubbing direction of the second substrate unit 20u. The rubbing direction can be determined by observing the anisotropy of the nonuniformity (e.g., the rubbing scratches, etc.) of the alignment of the liquid crystal layer 30 that occurs when a voltage (particularly a direct-current voltage) is applied to the liquid crystal layer 30, etc. Also, the alignment direction can be identified by measuring the optical characteristics of the liquid crystal optical element unit 110u while rotating the liquid crystal optical element unit 110u. The liquid crystal alignment of the liquid crystal layer 30 may be formed by a photo-alignment method, etc., and may be formed by any method.

Figure 3A:
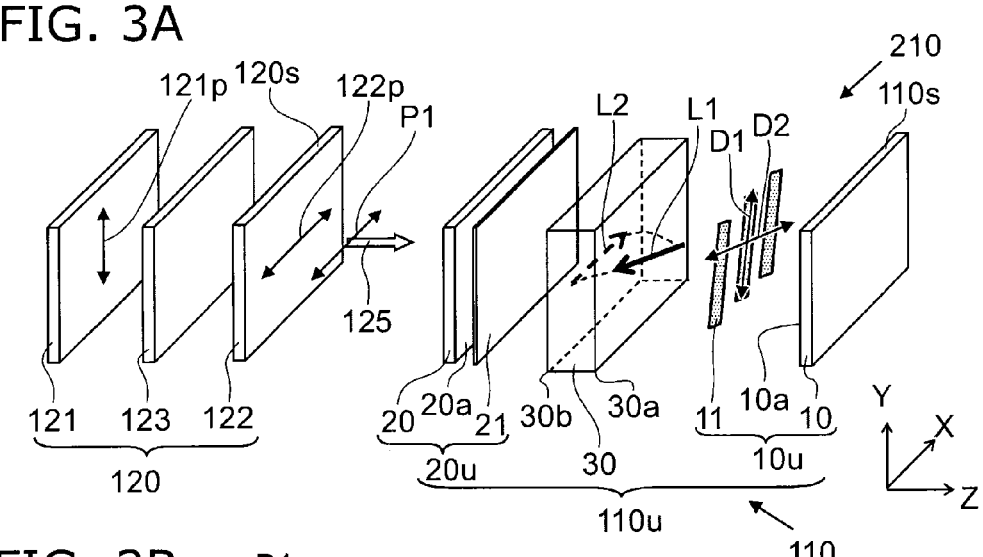
FIG. 3A to FIG. 3C are schematic views illustrating the state of use of the liquid crystal lens device according to the first embodiment.
Figure 3B:
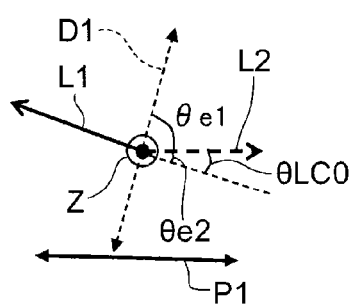
Figure 3C:
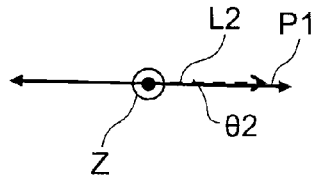

FIG. 3A to FIG. 3C are schematic views illustrating the state of use of the liquid crystal lens device according to the first embodiment.

FIG. 3A is a schematic perspective view illustrating configurations of the liquid crystal lens device 110 and the image display device 210. FIG. 3B and FIG. 3C are schematic views illustrating the optical axis of the liquid crystal lens device 110 and the image display device 210. In FIG. 3A, the components are drawn as being separated from each other for easier viewing.

As illustrated in FIG. 3A, the first polarizing layer 121 of the display unit 120 has a first transmission axis 121p. The first transmission axis 121p is an axis perpendicular to the absorption axis of the first polarizing layer 121 (e.g., the extension direction of the first polarizing layer 121). The second polarizing layer 122 has a second transmission axis 122p. The second transmission axis 122p is an axis perpendicular to the absorption axis of the second polarizing layer 122 (e.g., the extension direction of the second polarizing layer 122).

In this example, the second polarizing layer 122 is disposed between the display liquid crystal layer 123 and the liquid crystal optical element unit 110u. The image light 125 which is polarized light that has a polarizing axis P1 is emitted from the display unit 120; and the image light 125 is incident on the liquid crystal optical element unit 110u.

The image light 125 is substantially linearly polarized light. The component of the vibration (the vibration of the electric field) of the image light 125 along the polarizing axis P1 is greater than the component of the vibration (the vibration of the electric field) of the image light 125 along an axis orthogonal to the polarizing axis P1.

The configuration of the display unit 120 is arbitrary. Any configuration such as, for example, a VA mode, a TN mode, an IPS mode, etc., is applicable to the display liquid crystal layer 123. The angle between the first transmission axis 121p and the second transmission axis 122p is set by the mode of the liquid crystal used in the display liquid crystal layer 123. A phase difference layer (a phase difference plate) may be provided in at least one selected from the region between the first polarizing layer 121 and the display liquid crystal layer 123 and the region between the second polarizing layer 122 and the display liquid crystal layer 123.

As illustrated in FIG. 3B, the polarizing axis P1 is substantially parallel to the second alignment direction L2. Thus, the display unit 120 causes the image light 125 which is the polarized light that has the polarizing axis P1 to be incident on the liquid crystal optical element unit 110u. The polarizing axis P1 is substantially parallel to the second alignment direction L2, which is the long-axis direction of the liquid crystal molecules on the second substrate unit 20u when projected onto the first major surface 10a.

In other words, the second alignment direction L2 of the liquid crystal optical element unit 110u is set to be substantially parallel to the polarizing axis P1 of the image light 125 emitted from the display unit 120.

Considering the manufacturing fluctuation, etc., in such a case as well, the state of being parallel includes the state in which the absolute value of the angle is not more than 5 degrees.

In other words, as illustrated in FIG. 3C, the absolute value of the angle (a second angle θ2) between the second alignment direction L2 and the polarizing axis P1 is not more than 5 degrees.

The first substrate 10, the second substrate 20, the first electrodes 11, and the counter electrode 21 may include, for example, a material that is transparent (transparent to the image light 125).

The first substrate 10 and the second substrate 20 may include, for example, glass, a resin, etc. For example, the first electrodes 11 and the counter electrode 21 include an oxide including at least one element selected from the group consisting of In, Sn, Zn, and Ti. The first electrodes 11 and the counter electrode 21 may include, for example, ITO. For example, the first electrodes 11 and the counter electrode 21 may be at least one selected from $In_2O_3$ and $SnO_3$. For example, the first electrodes 11 and the counter electrode 21 may be thin metal layers.

The first alignment film 16 and the second alignment film 26 may include, for example, a resin such as polyimide, etc. For example, the film thicknesses of the first alignment film 16 and the second alignment film 26 are 200 nm (e.g., not less than 100 nm and not more than 300 nm).

For example, the liquid crystal layer 30 includes a nematic liquid crystal.

The dielectric anisotropy of the liquid crystal included in the liquid crystal layer 30 is, for example, positive. The state in which a voltage is not applied to the liquid crystal layer 30 is taken as a non-activated state. In the case where the liquid crystal layer 30 has a threshold voltage, the non-activated state may be the state in which a voltage that is not more than the threshold voltage is applied. The state in which the voltage is applied to the liquid crystal layer 30 is taken as an activated state. This voltage is greater than the threshold voltage. For example, in the non-activated state, the liquid crystal layer 30 has a substantially horizontal alignment. In this state, the long-axis direction of the liquid crystal molecules when projected onto the first major surface 10$a$ corresponds to the alignment direction. In the case where the dielectric anisotropy is positive, the pretilt angle of the liquid crystal (the angle between the director and the major surface of the substrate) in the non-activated state is, for example, not less than 0 degrees and not more than 30 degrees.

The dielectric anisotropy of the liquid crystal included in the liquid crystal layer 30 may be negative. For example, in the activated state in which the voltage is applied to the liquid crystal layer 30, the long-axis direction of the liquid crystal molecules of the liquid crystal layer 30 has a component parallel to the first major surface 10$a$. In this state, the long-axis direction of the liquid crystal molecules when projected onto the first major surface 10$a$ corresponds to the alignment direction. In the case where the dielectric anisotropy is negative, the pretilt angle of the liquid crystal in the non-activated state is, for example, not less than 60 degrees and not more than 90 degrees.

Thus, the liquid crystal optical element unit 110$u$ is used in combination with the display unit 120. It was found that moiré occurs in such a state of use. It was found that this occurs due to the alignment of the pixels provided in the display unit 120 interfering with the alignment of the first electrodes 11 of the liquid crystal optical element unit 110$u$.

According to investigations of the inventor of the application, it was found that the moiré is suppressed and the moiré practically is no longer perceived by tilting the extension direction (the first direction D1) of the first electrodes 11 with respect to the alignment of the pixels provided in the display unit 120. For example, the angle of the tilt is not less than about 5 degrees and not more than about 45 degrees. More specifically, the angle (the angle between the first direction D1 and the direction of the alignment of the pixels provided in the display unit 120) is not less than about 7 degrees and not more than about 15 degrees. The angle at which the moiré practically is not perceived changes according to the specifications of the alignment of the pixels, the number of the multiple parallax pixels, etc.

For example, to suppress the moiré, a configuration in which the arrangement direction of the pixels provided in the display unit 120 is tilted in the display surface may be used. However, from the viewpoint of the design and the manufacture of the display device, the alignment of the pixels in which the arrangement direction of the pixels is tilted in the surface cannot be employed practically. In other words, practically, the arrangement direction of the pixels provided in the display unit 120 is set to be perpendicular or parallel to the direction of a side of the display surface of the display unit 120.

On the other hand, it is advantageous for the angle between the polarizing axis P1 of the image light 125 and the arrangement direction of the pixels (or the direction of the side of the display surface) to be, for example, 0 degrees, 45 degrees, or 90 degrees. In such a case, for example, it is easy to obtain high light utilization efficiency and a high contrast ratio in the display liquid crystal layer 123, etc., that are used in the display unit 120. Also, because the polarizing layer (the polarizer) is manufactured by being elongated, it is advantageous for the angle between the arrangement direction of the pixels and the polarizing axis P1 to be 0 degrees or 90 degrees to obtain a larger polarizing layer.

From such a viewpoint, the polarizing axis P1 of the image light 125 emitted from the display unit 120 is fixed at a prescribed angle. For example, although it is possible to rotate the polarizing axis P1 by using a phase difference layer, etc., it is difficult to employ such a configuration because the number of parts increases.

Therefore, to suppress the moiré, it was investigated to tilt the extension direction (the first direction D1) of the first electrodes 11 in the surface. However, it was found that various problems may occur in the case where the extension direction (the first direction D1) of the first electrodes 11 is tilted in the surface.

In the liquid crystal optical element unit 110$u$ as described above, the refractive index distribution 31 is formed along the second direction D2. Accordingly, it is desirable for the polarizing axis P1 of the image light 125 to be parallel to the second direction D2. In the case where the polarizing axis P1 is tilted with respect to the second direction D2 and the alignment of the liquid crystal layer 30 is a parallel alignment without twist, the vibration direction of the light of the polarizing axis P1 is a direction that is tilted with respect to the long axis of the liquid crystal molecules. Therefore, in such a case, the effective change of the refractive index distribution 31 formed in the liquid crystal layer 30 decreases. In the case where the effective change of the refractive index distribution 31 decreases, the lens effect of modulating the travel direction of the light can no longer be sufficiently realized.

The inventor of the application investigated introducing a twist alignment to the liquid crystal layer 30 in addition to tilting the extension direction (the first direction D1) of the first electrodes 11 in the surface. In other words, the alignment direction (the second alignment direction L2) of the second substrate unit 20$u$ on which the image light 125 which has the polarizing axis P1 is incident is set to be substantially parallel to the polarizing axis P1. Then, the alignment of the liquid crystal is twisted inside the liquid crystal layer 30 from the second substrate unit 20$u$ to the first substrate unit 10$u$. On the first substrate unit 10$u$, the alignment direction (the first alignment direction L1) of the liquid crystal is set to be substantially parallel to the second direction D2.

Thereby, in the second layer 30$b$ that contacts the second substrate unit 20$u$ where the light is incident on the liquid crystal layer 30, the polarizing axis P1 of the light matches the long-axis direction of the liquid crystal molecules; and the light is incident with the plane of polarization being substantially maintained. Then, as the light travels through the liquid crystal layer 30, the plane of polarization of the light rotates due to the optical rotatory properties of the liquid crystal layer 30; and the state is maintained in which the plane of polarization matches the long-axis direction of the liquid crystal molecules. Then, in the first layer 30$a$ on the first substrate unit 10$u$, the plane of polarization of the light is substantially parallel to the second direction D2. Thereby, a large change of the refractive index is obtained.

In the embodiment, the moiré can be suppressed while maintaining a large effective change of refraction with respect to the image light 125 that is incident. According to the embodiment, a liquid crystal lens device and an image display device that have good optical characteristics can be provided.

In this example, the image light 125 which is polarized light is formed by the second polarizing layer 122 that is included in the display unit 120. The embodiment is not limited thereto; and a portion corresponding to the second polarizing layer 122 may be included in the liquid crystal lens device 110.

In other words, the liquid crystal lens device 110 may further include a polarizing layer (e.g., the second polarizing layer 122 illustrated in FIG. 3A) in addition to the first substrate unit 10u, the second substrate unit 20u, and the liquid crystal layer 30. The second substrate unit 20u is disposed between the first substrate unit 10u and the polarizing layer (the second polarizing layer 122). The polarizing layer (e.g., the second polarizing layer 122) causes the polarized light (e.g., the image light 125) that has the polarizing axis parallel to the second alignment direction L2 to be incident on the liquid crystal layer 30 via the second substrate unit 20u, where the second alignment direction L2 is the long-axis direction of the liquid crystal molecules on the second substrate unit 20u when projected onto the first major surface 10a. In such a case as well, a liquid crystal lens device that has good optical characteristics can be provided. The polarizing layer (e.g., the second polarizing layer 122) may be considered to be included in the liquid crystal optical element unit 110u.

Considering the actual device configuration as illustrated in FIG. 3A, it is favorable for one side 120s (in the extension direction) of the exterior form of the display unit 120 to be parallel or perpendicular to one side 110s (in the extension direction) of the exterior form of the liquid crystal optical element unit 110u. The exterior form is larger in the case where these angles are tilted.

On the other hand, the exterior form of the liquid crystal optical element unit 110u has the side 110s that is parallel to the first major surface 10a. It is favorable for the second alignment direction L2 to be parallel or perpendicular to the extension direction of the side 110s. Thereby, the exterior form of the device can be small in the combination with the display unit 120.

It is favorable for the angle between the first direction D1 and the extension direction of the side 110s to be not less than 5 degrees and not more than 45 degrees or not less than 45 degrees and not more than 85 degrees. It is favorable for the angle between the second direction D2 and the extension direction of the side 110s to be not less than 5 degrees and not more than 45 degrees or not less than 45 degrees and not more than 85 degrees. Thereby, the exterior form of the device can be small while suppressing the moiré.

Figure 4:
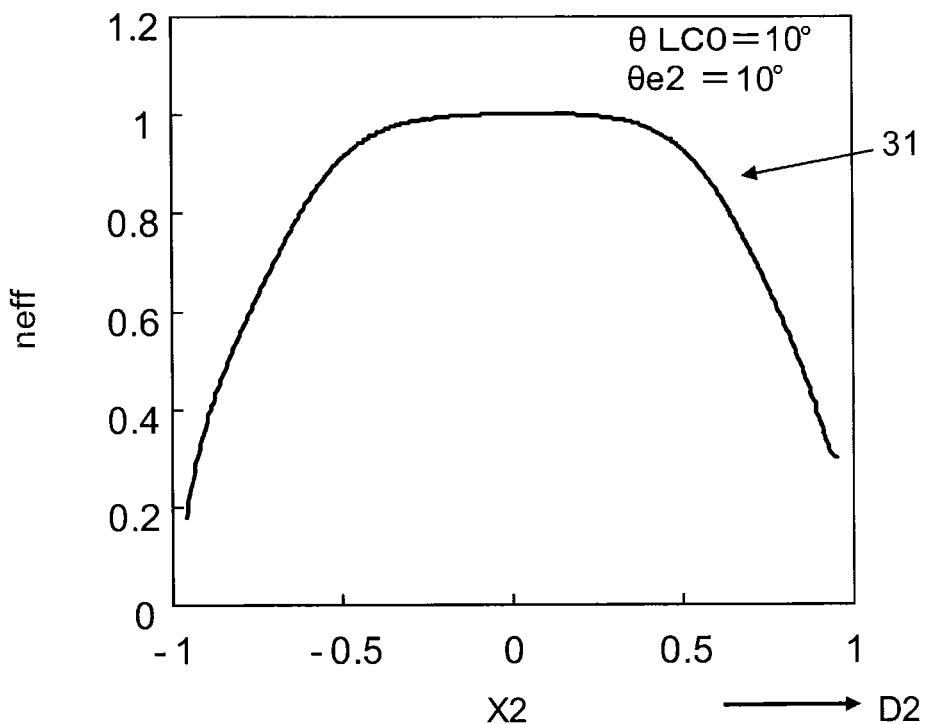
FIG. 4 is a graph illustrating a characteristic of the liquid crystal lens device according to the first embodiment.

FIG. 4 is a graph illustrating a characteristic of the liquid crystal lens device according to the first embodiment.

FIG. 4 illustrates results of a simulation of the refractive index distribution 31 of the liquid crystal optical element unit 110u of the liquid crystal lens device 110.

In this simulation, the disposition pitch of the first electrodes 11 (the distance between the centers of the first electrodes 11 along the second direction D2) was 480 μm; and the width of the first electrode 11 (the length along the second direction D2) was 20 μm. The thickness of the liquid crystal layer 30 was 75 μm.

The angle (the electrode extension angle θe1) between the first direction D1 and the second alignment direction L2 was 80 degrees. In other words, the angle (the electrode orthogonal angle θe2) between the second direction D2 and the second alignment direction L2 was 10 degrees. The twist angle θLC0 of the liquid crystal layer 30 was 10 degrees. The second alignment direction L2 was parallel to the polarizing axis P1 of the incident light (corresponding to the image light 125).

The horizontal axis of FIG. 4 is a position x2 along the second direction D2 and is normalized such that ½ of the disposition pitch of the first electrodes 11 is 1. The vertical axis is the refractive index neff of the liquid crystal layer 30. The refractive index neff is normalized such that the maximum value is 1.

As illustrated in FIG. 4, the refractive index neff changes between the first electrodes 11; and good lens characteristics are obtained. FIG. 4 is one example of the refractive index distribution 31; and the characteristic (the configuration) of the refractive index distribution 31 changes according to the applied voltage.

Figure 5:
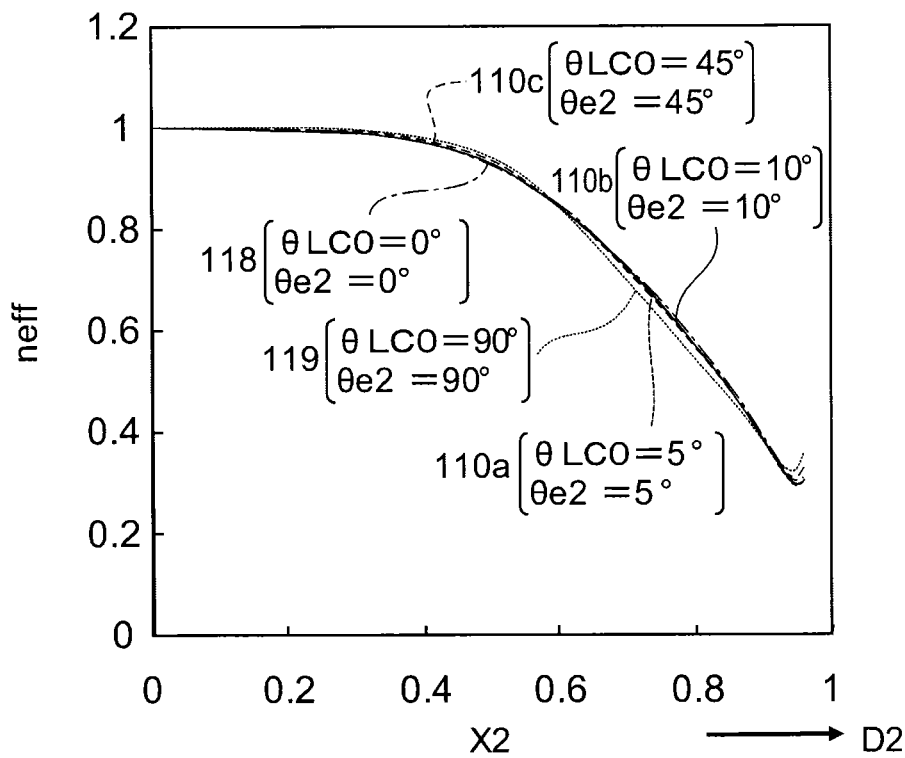
FIG. 5 is a graph illustrating characteristics of the liquid crystal lens device according to the first embodiment.

FIG. 5 is a graph illustrating characteristics of the liquid crystal lens device according to the first embodiment.

FIG. 5 illustrates results of a simulation of the refractive index distribution 31 of the liquid crystal optical element unit. In this simulation, the twist angle θLC0 of the liquid crystal layer 30 was changed. In other words, the effective refractive index neff was determined using a simulation for the cases where the twist angle θLC0 was 5 degrees (a liquid crystal lens device 110a), 10 degrees (a liquid crystal lens device 110b), 45 degrees (a liquid crystal lens device 110c), 0 degrees (a liquid crystal lens device 118), and 90 degrees (a liquid crystal lens device 119). In this case, the angle (the electrode orthogonal angle θe2) between the second direction D2 and the second alignment direction L2 was the same as the twist angle θLC0. The horizontal axis of FIG. 5 is the position x2 along the second direction D2, illustrates the range of ½ of the disposition pitch, and is normalized such that ½ of the disposition pitch of the first electrodes 11 is 1.

As illustrated in FIG. 5, the characteristic of the refractive index neff for the liquid crystal lens devices 110a, 110b, and 110c for which the twist angle θLC0 was 5 degrees, 10 degrees, and 45 degrees substantially matches the refractive index neff of the liquid crystal lens device 118 for which the twist angle θLC0 was 0 degrees. In FIG. 5, the lines of the liquid crystal lens devices 110a, 110b, and 110c substantially overlay the line of the liquid crystal lens device 118.

Conversely, in the case of the liquid crystal lens device 119 for which the twist angle θLC0 is 90 degrees, the characteristic of the refractive index neff is shifted from the characteristic of the liquid crystal lens device 118. It is considered that this is because the control of the configuration of refractive index distribution is difficult due to the change of the behavior of the alignment deformation with respect to the electric field.

Thus, in the case where the twist angle θLC0 is not more than 45 degrees, the same refractive index characteristic is obtained as when the twist angle θLC0 is 0 degrees.

Figure 6:
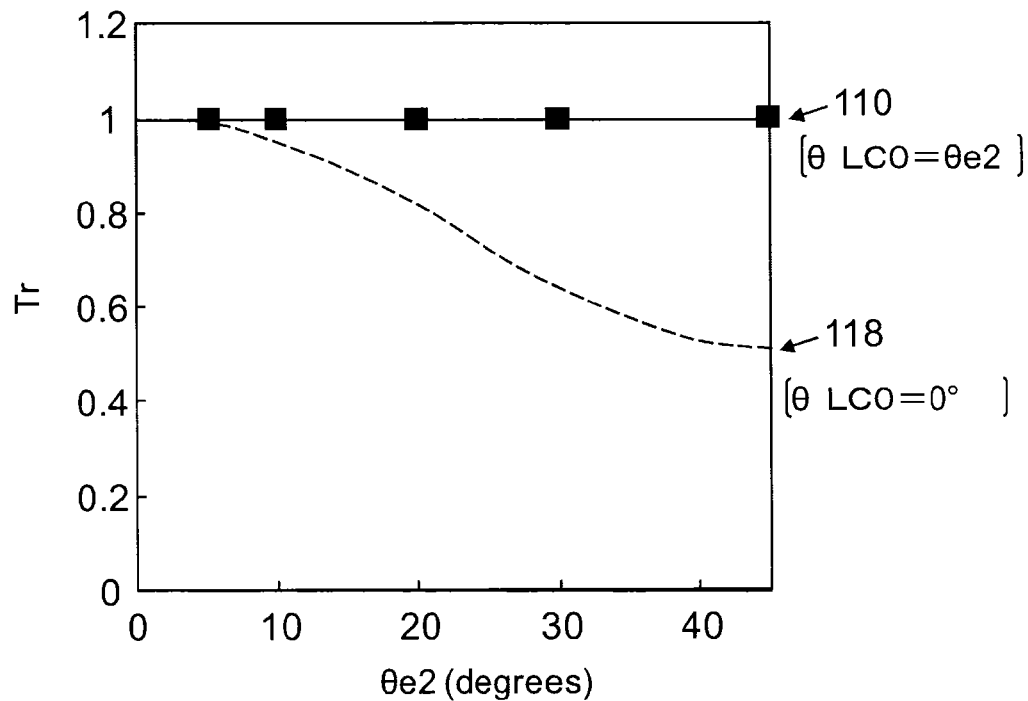
FIG. 6 is a graph illustrating a characteristic of the liquid crystal lens device according to the first embodiment.

FIG. 6 is a graph illustrating a characteristic of the liquid crystal lens device according to the first embodiment.

FIG. 6 illustrates results of a simulation of the transmittance of the light emitted from the liquid crystal optical element unit 110u in the case where the liquid crystal optical element unit 110u and the display unit 120 are stacked. In this simulation, the polarizing axis P1 of the image light 125 emitted from the display unit 120 was parallel to the X-axis direction (e.g., the horizontal axis). The angle (the electrode orthogonal angle θe2) between the second alignment direction L2 and the second direction D2 which is orthogonal to the extension direction of the first electrodes 11 was changed within the range of 0 degrees to 45 degrees. A simulation was performed for the characteristics relating to the case where the twist angle θLC0 was the electrode orthogonal angle θe2 (the liquid crystal lens device 110 of the twist alignment) and the case where the twist angle θLC0 was 0 degrees (the liquid crystal lens device 118 of the parallel alignment). The horizontal axis of FIG. 6 is the electrode orthogonal angle θe2.

The vertical axis is a transmittance Tr relating to the light that has the polarizing axis P1 (corresponding to the image light 125). The transmittance Tr is normalized such that the maximum value is 1.

In the liquid crystal lens device 118 of the parallel alignment as illustrated in FIG. 6, the transmittance Tr markedly decreases when the angle (the electrode orthogonal angle θe2) of the first electrodes 11 increases.

Conversely, a decrease of the transmittance Tr is not observed in the liquid crystal lens device 110 which has a twist alignment such that the twist angle θLC0 is the same as the electrode orthogonal angle θe2.

From the characteristics illustrated in FIG. 5 and FIG. 6, it is favorable for the twist angle θLC0 (i.e., the electrode orthogonal angle θe2) to be not more than 45°. From the viewpoint of suppressing the moiré, it is favorable for the electrode orthogonal angle θe2 to be set to be not less than 5°. In other words, it is favorable for the twist angle θLC0 to be set to be not less than 5°.

In the case where the extension direction of the first electrodes 11 and the alignment direction of the liquid crystal are strictly orthogonal in the embodiment, reverse tilt in which the tilt direction of the liquid crystal molecules reverses may occur at the peripheries of the first electrodes 11 when applying the voltage. It was found that the reverse tilt can be suppressed by slightly tilting the alignment direction of the liquid crystal with respect to the extension direction of the first electrodes 11. Therefore, for example, the absolute value of the angle between the first alignment direction L1 and the second direction D2 which is orthogonal to the extension direction of the first electrodes 11 may be set to be greater than 0 degrees and not more than 5 degrees. Thereby, the reverse tilt can be suppressed; and better characteristics can be obtained.

Second Embodiment

Figure 7:
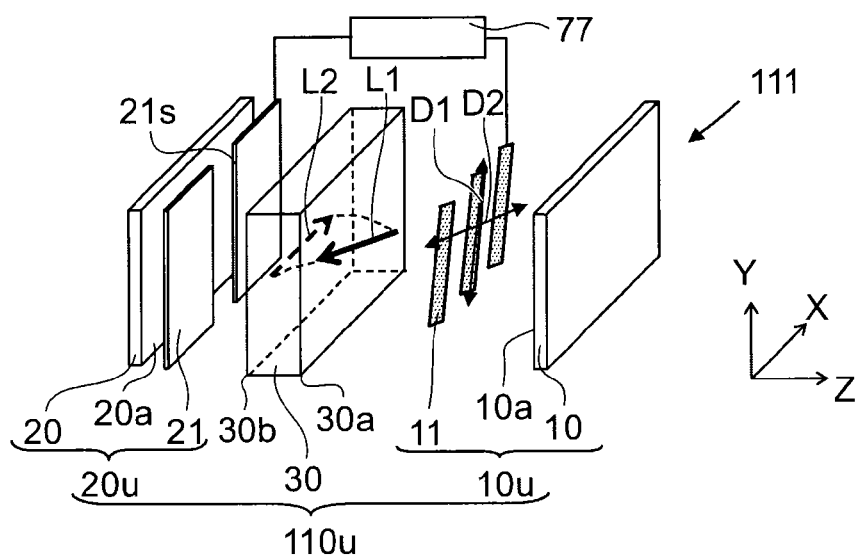
FIG. 7 is a schematic perspective view illustrating the configuration of a liquid crystal lens device according to a second embodiment.

FIG. 7 is a schematic perspective view illustrating the configuration of a liquid crystal lens device according to a second embodiment. As illustrated in FIG. 7, the liquid crystal lens device 111 according to the embodiment includes the liquid crystal optical element unit 110u. The liquid crystal lens device 111 may further include the control unit 77.

The liquid crystal optical element unit 110u includes the first substrate unit 10u, the second substrate unit 20u, and the liquid crystal layer 30. The configurations of the first substrate unit 10u and the liquid crystal layer 30 of the liquid crystal lens device 111 may be the same as those of the liquid crystal lens device 110, and a description is therefore omitted.

In the liquid crystal lens device 111 as well, the second substrate unit 20u includes the second substrate 20 and the counter electrode 21. The counter electrode 21 is provided on the second major surface 20a of the second substrate 20. In the embodiment, the counter electrode 21 has a slit 21s. For example, the slit 21s extends in a direction orthogonal to the alignment direction (i.e., the second alignment direction L2), which is the long-axis direction of the liquid crystal molecules on the second substrate unit 20u when projected onto the first major surface 10a. However, the embodiment is not limited thereto. The extension direction of the slit 21s may be tilted with respect to the second alignment direction L2.

In this example, the counter electrode 21 has a band configuration. The width of the band configuration of the counter electrode 21 (the width of the portion divided by the slit 21s) is wider than the width of the first electrode 11.

It becomes easier to control the refractive index distribution 31 formed in the liquid crystal layer 30 by making the slit in the counter electrode 21.

In the liquid crystal layer 30 in such a case as well, the first alignment direction L1, which is the long-axis direction of the liquid crystal molecules on the first substrate unit 10u when projected onto the first major surface 10a, is substantially orthogonal to the first direction D1. The liquid crystal layer 30 has an alignment twisted by an angle not less than 5 degrees and not more than 45 degrees along an axis perpendicular to the first major surface 10a.

Thereby, the moiré can be suppressed in the combination with the display unit 120 while maintaining a large change of the refractive index. Further, a high transmittance can be maintained.

The image display device 210 may include the liquid crystal lens device 111 and the display unit 120 recited above. In such a case as well, the display unit 120 causes the image light 125 which is the polarized light that has the polarizing axis P1 to be incident on the liquid crystal optical element unit 110u. The polarizing axis P1 is parallel to the second alignment direction L2. The second alignment direction L2 is the long-axis direction of the liquid crystal molecules on the second substrate unit 20u when projected onto the first major surface 10a.

According to the embodiments, a liquid crystal lens device and an image display device having good optical characteristics are provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the embodiments of the invention are not limited to these specific examples. For example, one skilled in the art may similarly practice the invention by appropriately selecting specific configurations of components included in liquid crystal lens devices such as first substrate units, second substrate units, liquid crystal layers, first substrates, first electrodes, second substrates, counter electrodes, and control units and specific configurations of image display devices such as display units, components of the display units, etc., from known art; and such practice is included in the scope of the invention to the extent that similar effects are obtained.

Further, any two or more components of the specific examples may be combined within the extent of technical feasibility and are included in the scope of the invention to the extent that the spirit of the invention is included.

Moreover, all liquid crystal lens devices and image display devices practicable by an appropriate design modification by one skilled in the art based on the liquid crystal lens devices and image display devices described above as embodiments of the invention also are within the scope of the invention to the extent that the spirit of the invention is included.

Various other alterations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image display device, comprising:
a liquid crystal lens device including a liquid crystal optical element unit, the liquid crystal optical element unit including
a first substrate unit including
a first substrate having a first major surface, and
a plurality of first electrodes provided on the first major surface to extend along a first direction, the first electrodes being arranged in a direction non-parallel to the first direction,
a second substrate unit including
a second substrate having a second major surface opposed to the first major surface, and
a counter electrode provided on the second major surface, and
a liquid crystal layer provided between the first substrate unit and the second substrate unit, the liquid crystal layer having a first alignment direction and a second alignment direction, the first alignment direction being a long-axis direction of liquid crystal molecules on the first substrate unit when projected onto the first major surface, the first alignment direction being orthogonal to the first direction, the second alignment direction being a long-axis direction of liquid crystal molecules on the second substrate unit when projected onto the first major surface, the liquid crystal layer having an alignment twisted between the first alignment direction and the second alignment direction by an angle not less than 5 degrees and not more than 45 degrees along a normal axis of the first major surface; and
an image display unit including a display unit, the second substrate unit being disposed between the first substrate unit and the display unit, the display unit being configured to cause image light of polarized light having a polarizing axis parallel to the second alignment direction to be incident on the liquid crystal optical element unit.

2. The device according to claim 1, wherein the counter electrode includes a slit.

3. The device according to claim 2, wherein the slit extends in a direction perpendicular to the second alignment direction.

4. The device according to claim 2, wherein a width of a portion of the counter electrode divided by the slit is wider than a width of the first electrode.

5. The device according to claim 1, further comprising a control unit electrically connected to the first electrodes and the counter electrode, the control unit being configured to form a refractive index distribution in the liquid crystal layer by controlling a potential of the first electrodes and a potential of the counter electrode.

6. The device according to claim 1, wherein
the first substrate unit further includes a first alignment film provided on the first electrodes, and
the second substrate unit further includes a second alignment film provided on the counter electrode.

7. The device according to claim 1, wherein
the liquid crystal layer has a pretilt angle not less than 0 degrees and not more than 30 degrees.

8. The device according to claim 1, wherein
the first substrate, the second substrate, the first electrodes and the counter electrode are transparent to the image light.

9. The device according to claim 8, wherein
the first electrodes and the counter electrode include an oxide including at least one element selected from the group consisting of In, Sn, Zn, and Ti.

10. The device according to claim 1, wherein
an angle between the first direction and a direction of an alignment of pixels provided in the display unit is not less than 7 degrees and not more than 15 degrees.

11. The device according to claim 1, wherein
the display unit includes a plurality of pixels,
a direction of an alignment of the pixels is perpendicular to the polarizing axis or parallel to the polarizing axis.

12. The device according to claim 1, wherein
the display unit includes a first polarizing layer, a second polarizing layer, and a display liquid crystal layer provided between the first polarizing layer and the second polarizing layer.

13. The device according to claim 1, wherein
the second alignment direction is parallel to or perpendicular to an extending direction of a side of an exterior form of the liquid crystal optical element unit, the side being parallel to the first major surface.

14. The device according to claim 1, wherein
an angle between the first direction and an extending direction of a side of an exterior form of the liquid crystal optical element unit is not less than 5 degrees and not more than 45 degrees or not less than 45 degrees and not more than 85 degrees, the side being parallel to the first major surface.

15. The device according to claim 1, wherein
an angle between a second direction and an extending direction of a side of an exterior form of the liquid crystal optical element unit is not less than 5 degrees and not more than 45 degrees or not less than 45 degrees and not more than 85 degrees, the second direction being parallel to the first major surface and perpendicular to the first direction, the side being parallel to the first major surface.

16. An image display device, comprising:
a liquid crystal lens device including a liquid crystal optical element unit, the liquid crystal optical element unit including
a first substrate unit including
a first substrate having a first major surface, and
a plurality of first electrodes provided on the first major surface to extend along a first direction, the first electrodes being arranged in a direction non-parallel to the first direction,
a second substrate unit including
a second substrate having a second major surface opposed to the first major surface, and
a counter electrode provided on the second major surface, and
a liquid crystal layer provided between the first substrate unit and the second substrate unit, the liquid crystal layer having a first alignment direction and a second alignment direction, the first alignment direction being a long-axis direction of liquid crystal molecules on the first substrate unit when projected onto the first major surface, an absolute value of an angle between the first alignment direction and a second direction being more than 0 degrees and not more than 5 degrees, the second direction being parallel to the first major surface and perpendicular to the first direction, the second alignment direction being a long-axis direction of liquid crystal molecules on the second substrate unit when projected onto the first major surface, the liquid crystal layer having an alignment twisted between the first alignment direction and the second alignment direction by an angle not less than 5 degrees and not more than 45 degrees along a normal axis of the first major surface; and an image display unit including a display unit, the second substrate unit being disposed between the first substrate unit and the display unit, the display unit being configured to cause image light of polarized light having a polarizing axis parallel to the second alignment direction to be incident on the liquid crystal optical element unit.

17. A liquid crystal lens device comprising a liquid crystal optical element unit, the liquid crystal optical element unit including:

a first substrate unit including
a first substrate having a first major surface, and
a plurality of first electrodes provided on the first major surface to extend along a first direction, the first electrodes being arranged in a direction non-parallel to the first direction;

a second substrate unit including
a second substrate having a second major surface opposed to the first major surface, and
a counter electrode provided on the second major surface; and a liquid crystal layer provided between the first substrate unit and the second substrate unit, a first alignment direction being orthogonal to the first direction, the first alignment direction being a long-axis direction of liquid crystal molecules on the first substrate unit when projected onto the first major surface, the liquid crystal layer having an alignment twisted by an angle not less than 5 degrees and not more than 45 degrees along a normal axis of the first major surface.

18. The device according to claim 17, wherein the counter electrode includes a slit.

19. The device according to claim 17, further comprising a control unit electrically connected to the first electrodes and the counter electrode, the control unit being configured to form a refractive index distribution in the liquid crystal layer by controlling a potential of the first electrodes and a potential of the counter electrode.

20. The device according to claim 17, further comprising a polarizing layer, the second substrate unit being disposed between the first substrate unit and the polarizing layer, the polarizing layer being configured to cause polarized light to be incident on the liquid crystal layer via the second substrate unit, the polarized light having a polarizing axis parallel to a second alignment direction, the second alignment direction being a long-axis direction of liquid crystal molecules on the second substrate unit when projected onto the first major surface.

* * * * *